United States Patent Office 3,337,356
Patented Aug. 22, 1967

3,337,356
POLYMERS CONTAINING CERTAIN
BENZOTRIAZOLES
Rudolph A. Carboni, Wilmington, Del., assignor to E. I. du Pont de Nemours and Company, Wilmington, Del., a corporation of Delaware
No Drawing. Original application Mar. 25, 1964, Ser. No. 354,758, now Patent No. 3,267,113, dated Aug. 16, 1966. Divided and this application May 2, 1966, Ser. No. 546,600
12 Claims. (Cl. 106—176)

This application is a divisional application of application Ser. No. 354,758, filed Mar. 25, 1964, now U.S. Patent No. 3,267,113 which was a continuation-in-part of application Ser. No. 173,806, filed Feb. 16, 1962, which in turn was a continuation-in-part of application Ser. No. 13,432, filed Mar. 8, 1960, the latter two applications being now abandoned.

This invention relates to polymeric compositions containing 2-(o-amidophenyl)-2,1,3-benzotriazoles (hereinafter referred to as "benzotriazoles"), to polymers of certain of the benzotriazoles, and to processes for preparing these compositions.

The benzotriazoles of application Ser. No. 354,758, filed Mar. 25, 1964, have been found to photostabilize polymers susceptible to degradation by light, such as natural polymers, addition and condensation synthetic polymers and copolymers, and mixtures of natural polymers, when they are incorporated into the polymer. In instances where the benzotriazole contains an unsaturated amido group, it is polymerizable and can be incorporated chemically into the polymer chain, that is, such benzotriazoles can themselves form polymers and copolymers.

THE BENZOTRIAZOLES

The benzotriazoles which are incorporated in the polymers to obtain the compositions of this invention have the structural formula (1) 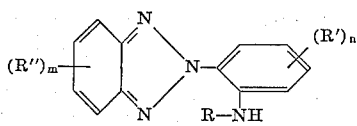

in which R is an acyl group defined in further detail below; R' and R" are alkyl, divalent alkenyl, more particularly defined hereinafter, alkoxy or an electronegative group, defined in further detail below; and $n$ and $m$ represent the number of R and R' groups present.

The acyl group, represented by R in the above formula, is defined as the group remaining after removal of the —OH moiety from a mono- or dicarboxylic, sulfonic, or phosphonic acid. Thus, R may be divided into three classes: carbacyl (R'''CO—), sulfonyl (R$^{IV}$SO$_2$—) and phosphonyl (R$^V$PO$_2$—).

When R is carbacyl (R'''CO—), the R''' moiety represents a wide range of organic groups.

R''' can be a hydrocarbon group containing from 1 to 19 carbon atoms free of acetylenic unsaturation, i.e., a hydrocarbon group in which any unsaturation is either ethylenic or of the benzenoid type. Thus, the hydrocarbon groups include alkyl, alkenyl, cycloalkyl, cycloalkenyl, aryl, alkaryl, aralkenyl, or aralkyl. Specific examples of R'''CO— when R''' is of the immediately preceding definition include acetyl, propionyl, butyroyl, valeroyl, capryloyl, tridecanoyl, octadecanoyl, acryloyl, crotonoyl, sorboyl, methacryloyl, α-ethacryloyl, α-butacryloyl, α-octaacryloyl, 1-octadecenoyl, cyclobutyroyl, cyclooctanoyl, cyclohexenoyl, benzoyl, naphthoyl, toluoyl, o-butylbenzoyl, 2,4,6-trimethylbenzoyl, β-methylnaphthoyl, α-phenacryloyl, hexahydrobenzoyl, phenacetyl, 1-naphthylacetyl, 2-phenylbutyroyl, pivaloyl, o-methylhexahydrobenzoyl, 1,4-dibutylhexahydrobenzoyl, and the like.

R''' may also be a substituted hydrocarbon group containing from 1 to 19 carbon atoms free of acetylenic unsaturation in which the substituents include halogen of atomic number 9–35 (fluorine, chlorine and bromine), nitro, amino, hydroxy, carboxy, metal carboxylate, halocarbonyl, alkoxy, and alkoxycarbonyl of up to 7 carbon atoms, and o-[2(2,1,3-benzotriazolyl)]-phenylaminocarbonyl. Specific examples of these R'''CO— groups include chloroacetyl, 3,4-dibromobutenoyl-1, ω-hydroperfluoropropionyl, perfluorobutanoyl, 2-aminocaproyl, α-bromocaproyl, 2-methyl-4-chlorobenzoyl, 1,6-dibromonaphthoyl, 2-nitropropionyl, 3,5-dinitrobenzoyl, hydroxyacetyl, ω-hydroxybutyroyl, salicyloyl, m-nitrosalicyloyl, methoxyacetyl, chloroformylacetyl, ω-ethoxybutyroyl, 5-butoxycapryloyl, carbethoxyacetyl, carboxyacetyl, 3-carboxypropionoyl, 5-carboxypentanoyl, 2- or 4-carboxybenzoyl, 2,3,5,6-tetramethyl-4-carboxybenzoyl. These last six groups are of course derived from dicarboxylic acids with one of the carboxyl groups forming the —CO— of R'''CO—. The remaining carboxy group can be converted to a different substituent, e.g., to a metal carboxylate, halocarbonyl, etc. These R'''CO— groups derived from dicarboxylic acids may be represented by the formula (2) 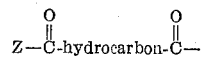

where Z is lower alkoxy, halogen (fluorine, chlorine or bromine), metal oxide (e.g., Ca, Ba or Zn oxides), and o-[2(2,1,3-benzotriazolyl)]-phenylamino. The hydrocarbon in this formula is preferably alkylene of 1 to 12 carbon atoms, cycloalkylene of 5–6 carbon atoms, phenylene or 2,3,5,6-tetramethylphenylene. More specifically, the substituents of Formula 2 can be represented by the formulas

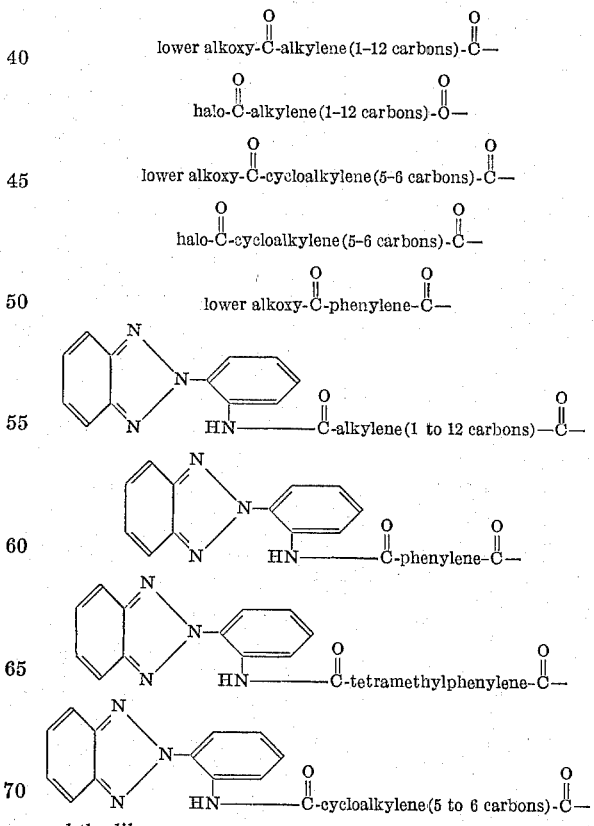

and the like.

R''' may also be a heterocyclic ring which can be monocyclic or fused bicyclic in which there may be 1–3 hetero atoms present selected from oxygen, sulfur or nitrogen, or combinations thereof, and which contains 3–9 carbon atoms. Examples of these R''' groups include pyridinyl, piperidinyl, furyl, thiazolyl, benzothiazolyl, quinoxalinyl, and the like.

When R is sulfonyl ($R^{IV}SO_2$—) or phosphonyl ($R^{V}PO_2$—), the $R^{IV}$ and $R^{V}$ moieties can be a hydrocarbon free of acetylenic unsaturation of from 1 to 19 carbon atoms. The specific hydrocarbon groups are the same as those used previously to define R'''. Specific examples of these acyl groups include ethanesulfonyl,
butanesulfonyl,
decanesulfonyl,
tetradecanesulfonyl,
methanephosphonyl,
butanephosphonyl,
methylhexanephosphonyl,
heptanephosphonyl,
propene-1-sulfonyl,
cyclohexanesulfonyl,
cyclohexanephosphonyl,
benzenesulfonyl,
benzenephosphonyl,
naphthalenesulfonyl,
o-methylbenzenesulfonyl,
toluenephosphonyl,
α-methylnaphthalenesulfonyl,
o-methylcyclohexanesulfonyl, and the like.

In addition, $R^{IV}$ may be a monovalent heterocyclic ring which can be monocyclic or fused bicyclic and of 4–9 carbon atoms wherein the hetero atoms are selected from oxygen, sulfur or nitrogen or combinations thereof. Examples of these acyl groups include pyridinesulfonyl, piperidinesulfonyl, α-methylpyridinesulfonyl, α-butyl-piperidinesulfonyl, benzothiazolesulfonyl, and the like.

R' and R'' may be the same or different, preferably the same, and are alkyl or alkoxy of up to 19 carbon atoms, alkenyl of 4 to 8 carbons, which forms a fused areno structure of 10–14 carbons with the benzo or aminophenyl rings, or an electronegative group. Exemplary of alkyl and alkoxy groups are ethyl, propyl, hexyl, octyl, decyl, dodecyl, tetradecyl, octadecyl, ethoxy, propoxy, butoxy, heptyloxy, decyloxy, tetradecyloxy, octadecyloxy and the like. Exemplary alkenyl radicals of 4 to 8 carbons which form a fused areno structure of 10 to 14 carbons with the benzo or aminophenyl rings are butadienylene and benzbutadienylene. The electronegative groups are halo of atomic number 9–35 (fluorine, chlorine, or bromine), nitro, sulfo, alkali metal, e.g., sodium sulfo salt, carboxy or cyano.

Areno is used herein to refer to the aromatic structures of 10 or 14 carbons formed by the fusion of a four or eight carbon system, in which a hydrogen atom has been removed from each of the terminal carbon atoms, to the benzo or 2-aryl rings, or to both. Thus, the radical formed by a four carbon areno group is naphthyl and phenanthryl by an eight carbon areno group.

Aromatic is used herein in its classical sense as defined, for example, in A. Todd's "Perspectives in Organic Chemistry," Interscience Publishers, Inc., New York (1956), page 28, etc.

There can be more than one R' or R'' group on the nucleus, thus $m$ and $n$ each are cardinal numbers which may vary from 0 to 4. Preferably $m$ and $n$ are 0 to 2. Of course where R' or R'' is an areno group, only one such group may be present, since it then forms a condensed ring system with the benzo or aminophenyl group. When no R' or R'' groups are present, i.e., when $m$ or $n$ is zero, the unsubstituted position on the ring contains hydrogen.

The benzotriazoles used in the compositions of this invention are prepared by acylating a 2-(o-aminophenyl)-2,1,3-benzotriazole as described in said application Ser. No. 354,758, filed Mar. 25, 1964.

Representative examples of the benzotriazole ingredient in the compositions of this invention include:

2-(o-acetamidophenyl)-2,1,3-benzotriazole [named 2-(o-N-monoacetamidophenyl)-2,1,3-benzotriazole in said application Ser. No. 354, 758]
2-(o-benzamidophenyl)-2,1,3-benzotriazole
2-(o-stearamidophenyl)-2,1,3-benzotriazole
2-[o-(p-anisamido)phenyl]-2,1,3-benzotriazole
2-[o-(2-methyl-4-chlorobenzamido)phenyl]-2,1,3-benzotriazole
2-(o-ethanesulfonamidophenyl)-2,1,3-benzotriazole
2-(o-2,3-dimethylbenzenesulfonamidophenyl)-2,1,3-benzotriazole
2-(o-3,5-dinitrobenzamidophenyl)-2,1,3-benzotriazole
2-(o-dodecanamidophenyl)-2,1,3-benzotriazole
2-(o-pyridin-3-amidophenyl)-2,1,3-benzotriazole
2-(o-quinolin-4-amidophenyl)-2,1,3-benzotriazole
2-[o-(t-butylsulfonamido)phenyl]-2,1,3-benzotriazole
2-(o-acrylamidophenyl)-2,1,3-benzotriazole
2-(o-camphoramidophenyl)-2,1,3-benzotriazole
2-(o-pivalamidophenyl)-2,1,3-benzotriazole
[2,2' - (2,3,5,6 - tetramethylterephthaloyldiimino) - o - phenylene]-bis-2,1,3-benzotriazole
2-(o-acetamidophenyl)-2,1,3-α,β-naphthotriazole
2-[o-(p-toluenesulfonamido)phenyl]-2,1,3-benzotriazole
2-(o-benzamidophenyl)-2,1,3-α,β-naphthotriazole
2-(o-methanesulfonamidophenyl)-2,1,3-benzotriazole
2-(o-cinnamamidophenyl)-2,1,3-benzotriazole
bis[2-(o-sebacamidophenyl)-2,1,3-benzotriazole]
2-(o-sebacamidophenyl)-2,1,3-benzotriazole
2-(o-phenacetamidophenyl)-2,1,3-benzotriazole
2-(o-hexahydrobenzamidophenyl)-2,1,3-benzotriazole
2-(o-methacrylamidophenyl)-2,1,3-benzotriazole
2-(o-furamidophenyl)-2,1,3-benzotriazole
bis[2-(o-terephthalamidophenyl)-2,1,3-benzotriazole]
2-(o-terephthalamidophenyl)-2,1,3-benzotriazole
ethyl 2-(o-oxamidophenyl)-2,1,3-benzotriazole
2-[o-(p-tert-butylbenzamido)phenyl]-2,1,3-benzotriazole
2-(o-1-naphthamidophenyl)-2,1,3-benzotriazole
2-(o-trifluoracetamidophenyl)-2,1,3-benzotriazole
2-(o-methanephosphonamidophenyl)-2,1,3-benzotriazole
2-(o-butanephosphonamidophenyl)-2,1,3-benzotriazole
2-(o-methylhexanephosphonamidophenyl)-2,1,3-benzotriazole
2-[o-(2,3-dichloroquinoxaline)-6-amidophenyl]-2,1,3-benzotriazole,
and the like.

For use in the compositions of this invention, the benzotriazoles are preferably those wherein R in Formula 1 is R'''CO— or $R^{IV}SO_2$—, and $m$ and $n$ are zero. Of these, R''' and $R^{IV}$ are preferably alkyl of 1 to 12 carbons, mono-unsaturated alkenyl of 2–12 carbons, unsubstituted and alkyl-substituted aryl of 6–10 ring carbon atoms, alkaryl of 7–12 carbons, and halogen-substituted alkyl or aromatic hydrocarbon groups of 6–10 ring carbons where the halogens are of atomic number 9–35, and the previously named hydrocarbon groups having an o - [2(2,1,3 - benzotriazolyl)] - phenylaminocarbonyl substituent. Most preferred $R^{IV}$ groups, because of their good photostability properties, are alkyl groups of 1 to 12 carbon atoms; and most preferred R''' groups, for the same reason, are alkyl of 1 to 12 carbon atoms, especially those derived from a sterically hindered carboxylic acid, and monoalkenyl of 2 to 12 carbon atoms wherein the double bond is between carbon atoms which are α,β with respect to the carbonamido group. "Sterically hindered carboxyl" is used herein in the accepted meaning, e.g., as in R. C. Fuson's "Advanced Organic Chemistry," John Wiley & Sons, Inc., New York (1950), pages 395 and 396.

Preferably, R' and R" are not present, i.e., $m$ and $n$ are zero, but when present, preferred R' and R" substituents are fluorine, chlorine, bromine, lower alkyl, lower alkoxy, sulfo, sodium sulfo salt, nitro, carboxy, and cyano, especially carboxy or lower alkyl and each of $m$ and $n$ is 1. When R' and R" are substituents other than carboxy, then $m$ and $n$ can be up to 4, but preferably are not more than 2.

THE POLYMERS

The above-described benzotriazoles are incorporated in polymers that are degraded by light, e.g., modified natural polymers, addition and condensation synthetic polymers and copolymers, and mixtures of modified natural polymers. Examples of condensation polymers are the macromolecular polyesters, polyamides, polycarbonates, and polyurethanes, and examples of addition polymers are polyethylene, polypropylene, polystyrene, polyvinyl chloride, polyvinyl fluoride, polyvinylidene fluoride, polyvinyl acetate, propionate, and butyrate, polyacrylonitrile, polymethacrylonitrile, polymethyl acrylate and methacrylate, copolymers of ethylene with such other polymerizable monomers as carbon monoxide, vinyl acetate, vinyl chloride, acrylo- and methacrylonitrile, methyl acrylate and methacrylate, acrylic and methacrylic acids, maleic and fumaric acids, and the like, copolymers of styrene with the aforementioned monomers, polyvinylpyrrolidone, polyvinyl succinimide, polyvinyltrimethyl acetate, and the like. Examples of modified natural polymers are nitrocellulose, cellulose acetate, propionate, and butyrate, regenerated cellulose, and the like.

THE PROCEDURE FOR PREPARING THE COMPOSITIONS OF THE INVENTION

The method by which the benzotriazoles are incorporated into the polymers is not critical and any method may be used. Thus, the benzotriazole may be added before, during, or after polymerization, or before or during spinning, or it can be added to fiber, film or finished product. Irrespective of how the subject aryltriazoles are incorporated into the polymer, they become an integral part of the polymer, chemically or physically. The amount of the benzotriazole employed is usually less than about 10% by weight, and generally from 0.01 to about 5% by weight.

For compositions of addition polymers and polymerizable unsaturated acyl derivatives of the 2-(o-aminophenyl)-2,1,3-benzotriazoles, i.e. where R''' in R'''CO— is alkenyl in which the ethylenic unsaturation is $\alpha,\beta$ with respect to the carbonyl group, as in acrylic or methacrylic acids, the monomers can be mixed and then copolymerized or the $\alpha,\beta$-ethylenically unsaturated carboxylic acid amide can be polymerized separately and added to preformed polymer. Also, the monomeric $\alpha,\beta$-ethylenically unsaturated carboxylic acid amide can be added to preformed polymer and graft polymerized thereon, by conventional techniques, as through the use of high energy radiation or thermal initiation. In the case of copolymers of ethylene with $\alpha,\beta$-ethylenically unsaturated carboxylic acids or esters, it is preferred to convert the acid or ester copolymer to the acid halide, as by reaction with thionyl chloride, and then treat the acid chloride with the 2-(o-aminophenyl-2,1,3-benzotriazole.

When the benzotriazole is used as a partial or complete replacement for a component in a condensation polymer, it is to be understood that it is then employed in an amount equal to that required to form the polymer.

THE COMPOSITIONS OF THE INVENTION

The incorporation of the benzotriazoles in the polymers results in the compositions of this invention. The compositions have enhanced photostability properties as compared to the polymer without the benzotriazole. This enhanced photostability results in improved resistance to embrittlement, discoloration, or other light-induced degradation of light-degradable polymers or fabricated articles, such as films, fibers, coatings, etc., consisting of or containing such polymers. Moreover, in the case of dyed polymeric compositions, the lightfastness of the dye is improved by incorporation of the benzotriazoles in the compositions.

The following examples illustrate in greater detail the compositions, their preparation, and their photostability.

Example 1

This experiment demonstrates the photostability and nonfluorescence or weak fluorescence of compositions of this invention. The property of fluorescence is a general indication that a material will not have sufficient photostability to be useful as an ultraviolet screener. Moreover, fluoresecnce brings about shade changes in dyed products at concentrations typical in ultraviolet light screener use and hence is a highly undesirable characteristic.

MEASUREMENTS OF PHOTOSTABILITY

Each subject sample of benzotriazole was dissolved in a separate solution of dimethylformamide and an acrylonitrile terpolymer, the latter being a product prepared as described in U.S. Patent 2,837,501. From these solutions films were cast having the following approximate properties: (1) thickness was about 0.001 inch; (2) weight of the sample used was about 0.5% weight of the polymer; (3) optical density at the long wave length absorption maximum of the sample was about 1.0. Each film was irradiated at room temperature in air with a high-pressure $10^3$ watt Xe lamp sold commercially as Osram XBO 1001, Optical filters were used which allowed only a band of wave length near the long wave length absorption maximum of the sample to be transmitted from lamp to film. The photolysis wave lengths were in the range of those present in the ultraviolet region of sunlight. The number of quanta per unit time absorbed by the sample was determined by standard uranyl oxalate actinometry. It was found that the optical density of the sample decreased linearly with absorbed dose. From these data a quantum yield was determined for the loss of optical absorption in the considered wave length range. In the tables below these data are expressed in units corresponding to the average number of quanta absorbed by a sample molecule before its absorption in this wave length range is lost. Thus large numbers indicate high photostability.

MEASUREMENTS OF FLUORESCENCE YIELD

Each sample was prepared as above and the film mounted in the entrance slit of a small grating monochromator. The 2537 A. line from a low-pressure Hg lamp was isolated by chemical filters and focused upon the sample. The fluorescence emission thus stimulated was dispersed by the monochromator, detected by a photomultiplier having S-13 cathode response and the resultant signal amplified and displayed upon a chart recorder. It was thus possible to obtain the fluorescence spectrum of each sample. Upon integrating the area under such a spectrum under standard instrumental conditions and making correction for the percentage of exciting light absorbed, values for the relative fluorescence quantum yields of the samples, i.e., relative number of quanta emitted in fluorescence per quantum absorbed, were derived. These data may be converted to absolute values by comparison of these spectra with the spectrum of a standard sample (cf. W. H. Melhuish, J. Phys. Chem. 64, 762 (1960)). Such a comparison was made and absolute values for fluorescence yields are quoted in the tables below.

Following the procedures set forth immediately above, the results shown in Table I were obtained. Column I of the table names the subject sample used in the above procedures. The second and third columns list the photostability and fluorescence yield, respectively, for each film incorporating the subject sample.

TABLE I

| Compound | Photostability | Fluorescence Yield |
|---|---|---|
| Phenyl-2,1,3-benzotriazole | 3,100 | 0.56 |
| 2-(o-acetamidophenyl)-2,1,3-benzotriazole | 13,000 | 0.007 |
| 2-(m-acetamidophenyl)-2,1,3-benzotriazole | 350 | 0.32 |
| 2-(p-acetamidophenyl)-2,1,3-benzotriazole | 450 | 0.40 |
| 2-(o-pivalamidophenyl)-2,1,3-benzotriazole | 120,000 | 0.005 |
| 2-(o-methanesulfonamido)-2,1,3-benzotriazole | 1,000,000 | ≤0.002 |

From the above table it can be seen that the basic, i.e., the unsubstituted phenylbenzotriazole has a fluorescence yield which is essentially the same as that of the m- and p-amidophenylbenzotriazoles but that it has higher photostability. This means that introducing the amido group into the m- or p-positions has decreased photostability without essentially changing fluorescence yield. On the other hand, introducing the amido group into the o-position has increased photostability and decreased fluorescence yield. This is an entirely unexpected result which could not have been predicted by such studies carried out on a mixture of the individual compounds. Moreover, the meta and para acetamidophenylbenzotriazoles or any mixture containing these isomers would impart a strong visible fluorescence to polymers when used at concentrations typical for screener use and could result in a shade change of the final dyed product. In contrast the 2-(o-acetamidophenyl)-2,1,3-benzotriazole is so weakly fluorescent that this property is unimportant in this respect, when the compound is used as an ultraviolet light absorber.

The data in Table I also shows that the 2-(o-methanesulfonamidophenyl) - 2,1,3 - benzotriazole possesses dramatically high photostability and, concomitantly, extremely low fluorescence yield. These remarkable properties make this product highly useful as an ultraviolet screener.

Furthermore, Table I discloses that amides of acids containing a sterically hindered carboxyl group have markedly higher photostabilities than amides of acids in which the carboxyl group is not sterically hindered (compare the pivalamido compound with the o-acetamido compound). The high degree of photostability of the aforementioned ortho-amidophenylbenzotriazoles makes these compounds highly useful as ultraviolet light screeners.

Example 2

In this example the benzotriazole is incorporated into the polymer structure by copolymerization. This example demonstrates the effectiveness of these compounds as photostabilizers when thus used.

A 300-ml. pressure vessel containing 112 ml. of benzene, 0.15 ml. of di-tert-butyl peroxide, and 1.0 g. of 2-(o-acrylamidophenyl)-2,1,3-benzotriazole was pressured to 3500 lb./sq. in. with ethylene at 24° C. The charge was then heated with agitation to 130° C. The pressure within the reactor was then 12,500 lb./sq. in. Whenever the pressure within the reactor dropped to 12,000 lb./sq. in., an additional 500 lb./sq. in. pressure of ethylene was added. The yield of copolymer was 15 grams; inherent viscosity, 1.36 at 0.1% concentration in α-chloronaphthalene at 125° C. The copolymer contained about 6 weight percent of recurring acrylamidophenylbenzotriazole units. Four-mil thick films were melt-pressed from this copolymer and from molding grade, medium density polyethylene. The films containing the benzotriazole lasted more than twice as long as the films from the polyethylene control, when subjected to accelerated weathering in an Atlas Weather-Ometer.[1]

A copolymer of ethylene and 2-(o-methacrylamidophenyl)-2,1,3-benzotriazole may be prepared in the same manner.

[1] Atlas Sunshine Arc Weather-Ometer, Model XW-R.

Example 3

1. THERMAL 2-(o-acrylamidophenyl)-2,1,3-benzotriazole (109) was placed in a flask under nitrogen and the flask immersed in an oil bath preheated to 250° C. The mixture was maintained at this temperature for 30 minutes, then extracted with o-dichlorobenzene (200 ml.) by refluxing for 30 minutes. All but a very small quantity dissolved. The cooled extract was poured, with stirring, into ethanol, whereupon the colorless polymer separated. The solid was collected by filtration, washed with fresh ethanol, then dried at reduced pressure.

*Analysis.*—Calcd. for $(C_{15}H_{12}N_4O)_n$: C, 68.16%; H, 4.57%; N, 21.20%. Found: C, 66.65%; H, 4.55%; N, 20.28%.

The infrared spectrum showed some similarity to the spectrum of the monomer, except for the appearance of saturated C—H peaks and the shift of the >C=O to frequencies associated with unconjugated amide carbonyls.

2. AZO INITIATION

A mixture of 100 g. of 2-(o-acrylamidophenyl)-2,1,3-benzotriazole and 2.0 l. of benzene containing 0.2 g. of α,α-azodiisobutyronitrile was stirred at reflux under nitrogen. After three hours, an additional 0.2 g. of α,α-azodiisobutyronitrile catalyst was added and heating continued for an additional hour. The mixture was allowed to stand at room temperature overnight. The viscous mixture was reheated to reflux, decolorized with activated carbon, and poured into three volumes of ethanol, whereupon the poly-2-(o-acrylamidophenyl)-2,1,3-benzotriazole precipitated. The colorless polymer was collected by filtration, washed with ethanol, then ether, and finally dried (72 g.).

*Analysis.*—Calcd. for $(C_{15}H_{12}N_4O)_n$: C, 68.17%; H, 4.57%; N, 21.20%. Found: C, 66.72%; H, 4.50%; N, 20.80%.

The infrared and ultraviolet spectra of this product were almost identical to that of the thermal polymer.

Example 4

2-(o-camphoramidophenyl) - 2,1,3 - benzotriazole was melt blended with a polyamide from hexamethylenediamine and adipic acid at 283° C. over a period of one hour in amount sufficient to provide 1% by weight thereof on the polymer. The polymer containing the additive was converted to yarn which was knit to tubing, dyed by standard techniques, and evaluated in the Xenotester [2] at four inches from the arc for lightfastness. Results were as follows:

| Dye | Xeno Hours | Polyamide plus 1% Additive | Polyamide with No Additive (Control) |
|---|---|---|---|
| Milling Yellow 5GL | 20 | *5–4 | *4–3 |
| Anthraquinone Blue SWF | 40 | 5–4 | 4 |
| Capracyl Blue G | 20 | 4 | 3 |

*5=no break. 1=severe break.

The above data show that the additive brought about an improvement in the lightfastness of the dye in the polyamide.

Example 5

Poly[2-(o-acrylamidophenyl)-2,1,3-benzotriazole] was mechanically blended into flake from a hexamethylenediamineadipic acid polyamide, and the mixture spun, knit to tubing, dyed by standard techniques, and evaluated for

[2] This is a Xenotest instrument Model PL 394, made by Kanau of Germany.

lightfastness by exposure in the Xenotester. Results obtained were as follows:

| Dye | Hours to First Significant Color Change | |
|---|---|---|
| | Polyamide plus 4.0% Additive | Polyamide with No Additive (Control) |
| Milling Yellow 5G | >40 | <20 |
| Milling Red SWB | >40 | <20 |
| Anthraquinone Green GNN | 80 | 40 |
| Cibacette Br. Pink FG | 80 | 40 |
| Capracyl Yellow 3RD | >160 | 80 |

The above data show that the additive brought about at least 100% improvement in the lightfastness of the dye in the polyamide. The high degree of photostability imparted to both dyed and undyed polymer compositions by the compounds of this invention is even more remarkable when one considers the relative photoinstability of the corresponding para-isomer, as illustrated by the following examples.

*Example 6*

Films were cast from cellulose acetate solutions containing 0.1 g. of 2-(o-acetamidophenyl)-2,1,3-benzotriazole and 2 g. of cellulose acetate and from similar solutions in which the benzotriazole was the para-isomer, i.e., 2-(p-acetamidophenyl)-2,1,3-benzotriazole. The films thus prepared were tested by cutting them into strips and superimposing the strips upon separate strips of a linear polyester fiber fabric which had been dyed at a 2% level with a light-sensitive Rhodamine red dyestuff and with a blue triphenylmethane dyestuff. The assemblies were exposed to light from a Fade-Ometer for 20 hours, with the following results.

| | Initial Appearance of Film | |
|---|---|---|
| | 2-(o-Acetamidophenyl)-2,1,3-benzotriazole | 2-(p-Acetamidophenyl)-2,1,3-benzotriazole |
| Daylight | Colorless | Light yellow. |
| Ultraviolet light | Not fluorescent | Fluorescent. |
| | Appearance of Film After Exposure | |
| Daylight | No change | Colorless. |
| Ultraviolet light | do | Decreased fluorescence. |

The above results show that the ortho-isomer is not fluorescent, in contrast to the para-isomer. The development of fluorescence is associated with photoinstability, and it is therefore clear that the para-isomer is not an effective ultra-violet light screening agent, in contrast with the ortho-isomer.

*Example 7*

Low-density polyethylene of molecular weight in the plastics range was blended by milling at 150° C. with 2-(o-benzamidophenyl)- and 2-(o-stearamidophenyl)-2,1,3-benzotriazole in amount sufficient to provide 0.5 to 1%, respectively, by weight of the triazole. The resulting product was melt-pressed at 160° C. into films of 6 to 8 mils in thickness, and the films were then exposed to a source of ultraviolet light, along with similar films of polyethylene containing no additive. The films containing 0.5% of the benzotriazole showed no embrittlement after 700 hours exposure and those with 1% were not embrittled even after 900 hours. The control films were embrittled after 200 to 300 hour exposure. These results show that the benzotriazole extends the useful life of the polyethylene film, even at 0.5% concentration, by from two to three fold.

*Example 8*

To a 33⅓% solution of general purpose, high-molecular-weight polystyrene in p-xylene there was added 2(o-methanesulfonamidophenyl) - 2,1,3 - benzotriazole in amount sufficient to provide one part of the benzotriazole to 100 parts of polymer. Films were prepared by doctoring the solution onto milk glass plates and air drying the coating at room temperature, followed by baking in an oven at 60° to 70° C. Similar films were prepared without added benzotriazole to serve as controls. The films prepared were exposed to a pair of 90 watt "black light" fluorescent lamps [3] at a distance of three inches from the lowest part of the fluorescent tube. The results are summarized in the table below.

| Additive | Time of Exposure (hours) | Reflectance* | | Decrease | Comments |
|---|---|---|---|---|---|
| | | Covered | Exposed | | |
| None | 285 | 55 | 12 | 43 | Very poor. |
| 2-o-methane sulfonamidophenyl)-2,1,3-benzotriazole. | 285 | 50 | 50 | 0 | Very good. |

*Measured by a photovolt reflection colorimeter which employs a blue filter.

The above results show that the 2-(o-methane sulfonamidophenyl)-2,1,3-benzotriazole gave perfect protection to the film, as evidenced by lack of color development.

*Example 9*

Two amides of 2-(o-aminophenyl)-2,1,3-benzotriazole, i.e., the methanesulfonamide and the 2,4-di-tert-amylphenoxyacetamide, were incorporated into commercial-grade, high-molecular-weight polyvinyl chloride by milling and films were then formed from the resulting compositions by pouring onto cylindrical 2¾ inch diameter tinned cups and heating 15 minutes in an oven at 180° C. to flux. Films were also formed from polyvinyl chloride containing no added amide as a control. The films were then exposed to "black light" fluorescent tubes for 168 hours. The results are shown in the table below.

| Additive | Amount of Additive Parts/100 Parts of Resin | Thickness of Films (mils) | Reflectance | | | |
|---|---|---|---|---|---|---|
| | | | Covered | Exposed | Decrease | Comments |
| None | | 91 | 22 | <0 | <22 | Very poor. |
| 2-(o-methane sulfonamidophenyl)-2,1,3,-benzotriazole. | 1 | 90 | 19 | 16 | 3 | Good. |
| 2-[o-(2,4-di-tert-amylphenoxyacet-amidophenyl)-2,1,3-benzotriazole]. | 1 | 89 | 22 | 18 | 4 | Do. |

[3] "Black lights" have a radiation peak of 3400 to 3600 A.

Polyvinyl chloride plastics discolor badly upon exposure to ultraviolet light unless skillfully formulated with suitable stabilizers.

The above results show that both the methanesulfonamido and the 2,4-tert-amylphenoxyacetamido derivatives of 2-(o-aminophenyl)-2,1,3-benzotriazole protected the polyvinyl chloride against discoloration on exposure to light.

*Example 10*

An ethyl cellulose composition consisting of 6 parts of ethyl cellulose, 1.5 parts castor oil, 1.5 parts of tricresyl phosphate, and 42.5 parts of an 80/20 toluene/butanol solvent mixture was prepared. To this solution there was added 2-(o-methanesulfonamidophenyl)-2,1,3-benzotriazole in amount sufficient to provide one part thereof per 100 parts ethyl cellulose. Films were prepared by doctoring the solution onto white opal glass plates using a 0.03 inch blade. The coatings thus made were allowed to dry in air for 24 hours and then exposed to a General Electric 275 volt type RS sun lamp at a distance of 12 inches below the sun lamp. As a control, similar films were made from the ethyl cellulose without added amide stabilizer. The results are shown in the table below.

The above results show that even after 96 hours exposure, the film containing the benzotriazole had shown substantially no change in contrast to the control film.

*Example 12*

Poly(hexamethylene adipamide) was prepared in a conventional manner except that 3% by weight of [2,2'-(2,3,5,6 - tetramethylterephthaloyldiimino) - o - phenylene]-bis-2,1,3-benzotriazole was added to the salt solution prior to evaporation. The extruded and cut nylon flake was no different in color from a control batch containing no stabilizer and had essentially an equal molecular weight as shown by its relative viscosity. The ultraviolet spectrum of a sulfuric acid solution of the modified polymer showed an optical density and maximum absorption wave length expected for the 3% additive modification illustrating that none of the additive was lost or altered during the melt-polymerization.

The test and control polymers were spun in a conventional manner except that 5% by weight of molten poly-(ethylene oxide) ether glycol of approximately 20,000 molecular weight was meter-injected and uniformly dispersed throughout the molten polyamide prior to spinning as described in Belgian Patent 631,199. The spun yarns

| Additive | Amount of Additive Parts/100 Parts Ethyl cellulose | Time of Exposure (hours) | Reflectance | | | Comments |
|---|---|---|---|---|---|---|
| | | | Covered | Exposed | Decrease | |
| None | None | 65 | 85 | 77 | 8 | Some embrittlement. |
| 2-(o-methane sulfonamidophenyl)-2,1-3,benzotriazole. | 1 | 65 | 83 | 79 | 4 | No embrittlement. |

Unlike nitrocellulose, ethyl cellulose degrades upon exposure to ultraviolet light without severe discoloration. Therefore, the strength of the film is used as a gauge for judging the performance of the stabilizers.

The above data show that the benzotriazole was very effective in preventing embrittlement. An additional advantage realized was the lack of color development in the film.

*Example 11*

In tests carried out on films of a methyl methacrylate/ethyl acrylate copolymer, excellent protection against discoloration was realized in films containing 2-(o-methanesulfonamidophenyl)-2,1,3-benzotriazole. These films were cast from solutions of the resin in toluene containing 40% of the resin by weight. To these solutions there was added 2 - (o-methanesulfonamidophenyl)-2,1,3-benzotriazole in amount sufficient to provide one part thereof per 100 parts of resin. The solutions were doctored onto opal glass plates with a 0.03 inch doctor knife and allowed to air dry 24 hours. The films thus obtained were exposed along with a control film containing no additive, under a G.E. 275 watt RS sun lamp. The results are summarized in the table below.

were drawn, bulked and tufted into carpet form by known techniques. Tensile properties of both the drawn and bulked fibers showed the test and control items to be essentially equivalent.

The tufted carpets were scoured preparatory to dyeing. Analysis of the U.V. spectrum of the scoured fibers showed no change in concentration of the added stabilizer. This was true even after several scourings.

The carpets were dyed with two compound dye shades using conventional procedures for three classes of dyes: acid, dispersed and premetallized. The dyed carpets were exposed under glass to Florida sunlight for 80 hrs. and compared to unexposed samples to determine the degree of fading. Comparisons were made by the Gray Rating Scale whereby 5 represents no change in shade and 1 represents almost complete loss of color. A full unit difference between items represented about a two-fold difference in fading rate between the samples. Quarter units up or down are represented by plus or minus signs respectively, and half units by hyphenated numbers. Results as shown in the following table average almost one full unit or a two-fold improvement in dye fading rate for the item containing the benzotriazole.

| Additive | Time of Exposure (hours) | Reflectance | | | Comments |
|---|---|---|---|---|---|
| | | Covered | Exposed | Decrease | |
| None | 96 | 96 | 90 | 6 | |
| 2-(o-methane sulfonamidophenyl)-2,1,3-benzotriazole. | 96 | 90 | 88 | 2 | Very good. |

| | Dye Class | | |
|---|---|---|---|
| | Acid | Disperse | Premetallized |
| | Dye Shade | | |
| | Cocoa | Sea Spray | Cocoa | Sea Spray | Cocoa | Sea Spray |
| Control | 2–3 | 2–3+ | 2+ 3–2 | 2 3–2 | 2 3 | 2+ 3 |
| Test Item | | | | | | |

As many apparently widely different embodiments of this invention may be made without departing from the spirit and scope thereof, it is to be understood that this invention is not limited to the specific embodiments described above.

The embodiments of the invention in which an exclusive property or privilege is claimed are defined as follows:
1. A composition of
   A. a polymer susceptible to degradation by light, and
   B. a light-stabilizing amount up to 10 percent, by weight of said polymer, of a benzotriazole of the formula

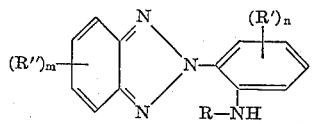

wherein R is an acyl group selected from the class consisting of
   (a) R'''CO— wherein R''' is a group of the class consisting of
       (1) hydrocarbon of 1 to 19 carbon atoms free of acetylenic unsaturation,
       (2) substituted hydrocarbon of 1 to 19 carbon atoms free of acetylenic unsaturation wherein the substituents are of the class consisting of fluorine, chlorine, bromine, nitro, amino, hydroxy, carboxy, metal carboxylate, halocarbonyl, alkoxy, and alkoxycarbonyl of up to 7 carbon atoms, and o-[2(2,1,3-benzotriazolyl)]-phenylaminocarbonyl, and
       (3) a heterocyclic ring selected from the group consisting of pyridinyl, piperidinyl, furyl, thiazolyl, benzothiazolyl, quinoxalinyl, quinolyl, and 2,3-dichloroquinoxalinyl;
   (b) $R^{IV}SO_2$— wherein $R^{IV}$ is a group of the class consisting of
       (1) hydrocarbon of 1 to 19 carbon atoms free of acetylenic unsaturation, and
       (2) a heterocyclic ring selected from the group consiting of pyridinyl, piperidinyl, α-methylpyridinyl, α-butylpiperidinyl and benzothiazolyl;
   (c) $R^VPO_2$— wherein $R^V$ is a hydrocarbon of 1 to 19 carbon atoms free of acetylenic unsaturation;
wherein R' and R'' each are of up to 19 carbon atoms and are selected from the group consisting of alkyl, alkoxy, alkenyl of 4 to 8 carbon atoms which forms a fused areno structure of 10 to 14 carbons with one of the benzo and aminophenyl moieties of the benzotriazole, fluorine, chlorine, bromine, nitro, sulfo, sulfo salt, carboxy, and cyano; and m and n each are cardinal numbers of from 0 to 4, inclusive.

2. The composition of claim 1 wherein the polymer is a polyamide.
3. The composition of claim 2 wherein component B is present in amounts of from 0.01 to 5.0 percent by weight of polymer.
4. The composition of claim 1 wherein m and n are zero, and R is R'''CO— wherein R''' is hydrocarbyl free of acetylenic unsaturation and contains less than 19 carbon atoms.
5. The composition of claim 4 wherein R''' is alkenyl of 2–12 carbon atoms.
6. The composition of claim 4 wherein R''' is alkyl of up to 12 carbon atoms.
7. The composition of claim 6 wherein the alkyl group is derived from a sterically hindered carboxylic acid.
8. The composition of claim 1 wherein m and n are zero and R is $R^{IV}SO_2$— wherein $R^{IV}$ is alkyl of up to 12 carbon atoms.
9. The composition of claim 1 wherein the polymer is derived from a terminally unsaturated ethylenic monomer, and the benzotriazole is derived from a benzotriazole wherein m and n are zero, and R is R'''CO— where R''' is mono-unsaturated alkenyl of 2–12 carbon atoms wherein the double bond is between carbon atoms which are α,β with respect to the carbonamido group, said polymer and said benzotriazole being chemically combined in copolymer form.
10. The composition of claim 9 wherein R''' is $CH_2=CH$—.
11. The composition of claim 5 wherein the unsaturation of the alkenyl group is between carbon atoms which are α,β with respect to the carbonamido group.
12. The composition of claim 1 wherein component B is a homopolymer of a compound of the formula

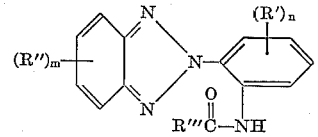

wherein R' and R'' each are of up to 19 carbon atoms and are selected from the group consisting of alkyl, alkoxy, alkenyl of 4 to 8 carbon atoms which forms a fused areno structure of 10 to 14 carbons with one of the benzo and aminophenyl moieties of the benzotriazole, fluorine, chlorine, bromine, nitro, sulfo, sulfo salt, carboxy, and cyano; m and n each are cardinal numbers of from 0 to 4, inclusive; and R''' is mono-unsaturated alkenyl of 2–12 carbon atoms wherein the double bond is between carbon atoms which are α,β with respect to the carbonamido group.

References Cited
UNITED STATES PATENTS

| 3,007,895 | 11/1961 | Roos et al. | 260—878 |
| 3,159,646 | 12/1964 | Milionis et al. | 260—308 |
| 3,162,696 | 12/1964 | Zimmerman et al. | 260—878 |
| 3,267,113 | 8/1966 | Carboni | 260—308 |

DONALD J. ARNOLD, *Primary Examiner.*